United States Patent
Wu et al.

(10) Patent No.: US 9,632,670 B2
(45) Date of Patent: *Apr. 25, 2017

(54) ODATA SERVICE PROVISIONING ON TOP OF GENIL LAYER

(71) Applicant: SAP SE, Walldorf (DE)

(72) Inventors: Zhiqiang Wu, Shanghai (CN); Christian Weiss, Speyer (DE); Joerg Singler, Zeutern (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/712,721

(22) Filed: May 14, 2015

(65) Prior Publication Data

US 2015/0253947 A1    Sep. 10, 2015

Related U.S. Application Data

(63) Continuation of application No. 13/463,406, filed on May 3, 2012, now Pat. No. 9,043,809.

(30) Foreign Application Priority Data

Apr. 26, 2012  (CN) .......................... 2012 1 0126439

(51) Int. Cl.
*G06F 3/0484* (2013.01)
*G06F 17/30* (2006.01)
*H04L 29/08* (2006.01)

(52) U.S. Cl.
CPC ...... *G06F 3/0484* (2013.01); *G06F 17/30569* (2013.01); *G06F 17/30876* (2013.01); *H04L 67/10* (2013.01); *H04L 67/32* (2013.01)

(58) Field of Classification Search
None
See application file for complete search history.

(56) References Cited

U.S. PATENT DOCUMENTS

| 7,664,860 B2 | 2/2010 | Singler et al. |
| 7,685,603 B2 | 3/2010 | Singler et al. |
| 2005/0021355 A1* | 1/2005 | Brendle .............. G06F 17/3056 705/1.1 |

(Continued)

OTHER PUBLICATIONS

European Communication with EP Office Action, for Appl. No. 13001859.1-1952 mailed Aug. 17, 2015; 11 pages.

(Continued)

*Primary Examiner* — Tuan Dao
(74) *Attorney, Agent, or Firm* — Fish & Richardson P.C.

(57) ABSTRACT

The disclosure generally describes computer-implemented methods, software, and systems for allowing provisioning of open data protocol (OData) services on top of a generic interaction layer (GenIL). One computer-implemented method includes receiving an OData-compliant request for data, determining a GenIL data provider to receive the OData-compliant request for data, determining the memory location of the data, requesting the data from the determined memory location, receiving the requested data from the determined memory location, converting, using at least one computer, the received data into an OData-compliant format, rendering an OData-compliant response, and transmitting the OData-compliant response.

20 Claims, 12 Drawing Sheets

(56) References Cited

U.S. PATENT DOCUMENTS

| | | | |
|---|---|---|---|
| 2006/0075382 A1* | 4/2006 | Shaburov | G06F 8/34 |
| | | | 717/106 |
| 2007/0094278 A1 | 4/2007 | Huppert et al. | |
| 2009/0089654 A1* | 4/2009 | Wittig | G06Q 10/107 |
| | | | 715/223 |
| 2011/0225143 A1* | 9/2011 | Khosravy | G06F 17/30471 |
| | | | 707/713 |
| 2012/0197963 A1 | 8/2012 | Bouw et al. | |
| 2012/0246202 A1* | 9/2012 | Surtani | G06F 17/30607 |
| | | | 707/812 |
| 2013/0144878 A1* | 6/2013 | James | G06F 17/30525 |
| | | | 707/736 |

OTHER PUBLICATIONS

European Communication and Extended European Search Report for Appl. No. 13001859.1-1952/2657858 mailed Feb. 20, 2014 (9 pages).
"CRM WebClient UI"; Wikipedia, Retrieved from Internet Feb. 5, 2014; 3 pages; [http://de.wikipedia.org/w/index.php?title=CRM_WebClient_UI&oldid=100240302].
"Open Data Protocol"; Wikipedia, Retrieved from Internet Feb. 7, 2014; 1 page; [http://en.wikipedia.org/w/index.php?title=Open_Data_Protocol&oldid=472912513].

* cited by examiner

ODATA SERVICE PROVISIONING ON TOP OF GENIL LAYER

CLAIM OF PRIORITY

This application claims priority under 35 U.S.C. §120 to U.S. patent application Ser. No. 13/463,406, filed May 3, 2012, and now issued as U.S. Pat. No. 9,043,809, issued May 26, 2015; which claims priority under 35 U.S.C. §119 to Chinese Patent Application No. 201210126439.X, filed Apr. 26, 2012, the entire disclosures of which are incorporated herein by reference.

TECHNICAL FIELD

The present disclosure relates to computer-implemented methods, software, and systems for allowing provisioning of OData services on top of a GenIL layer.

BACKGROUND

Access to a business suite system is typically provided through a custom graphical user interface which interfaces with back-end business objects and data through a business object layer using an associated generic interaction layer (GenIL). With the rise in use of mobile computing and other computing platforms, such as smart phones and tablet computers, the use of open data protocol (OData) is becoming more prevalent. Allowing devices to access the business suite system using OData has necessitated the development of custom OData-GenIL interfaces. The development of the custom OData-GenIL interfaces has resulted in a high cost of development and maintenance for each OData-GenIL interface and an overall higher total cost of ownership for the business suite system.

SUMMARY

The present disclosure relates to computer-implemented methods, software, and systems for allowing provisioning of OData services on top of a GenIL layer. One computer-implemented method includes receiving an OData-compliant request for data, determining a GenIL data provider to receive the OData-compliant request for data, determining the memory location of the data, requesting the data from the determined memory location, receiving the requested data from the determined memory location, converting, using at least one computer, the received data into an OData-compliant format, rendering an OData-compliant response, and transmitting the OData-compliant response.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation can include all the following features:

In a first aspect, combinable with the general implementation, the OData-compliant request for data is for at least one of an object model or object-model-associated runtime data.

In a second aspect, combinable with any of the previous aspects, the OData-compliant request for data is generated pre-runtime.

In a third aspect, combinable with any of the previous aspects, the object-model-associated runtime data is associated with an object model mapped from a GenIL-compliant format to an OData-compliant format.

In a fourth aspect, combinable with any of the previous aspects, the GenIL data provider is for providing GenIL-compliant data for at least one of an object model or runtime data.

In a fifth aspect, combinable with any of the previous aspects, the request for data from the determined memory location is in a GenIL-compliant format.

A sixth aspect, combinable with any of the previous aspects, includes constructing an OData object model from the received data.

The subject matter described in this specification can be implemented in particular implementations so as to realize one or more of the following advantages. First, a generic adaptor may be implemented to facilitate communication between OData services and a GenIL interface communicating with a back-end memory. Second, there is no need to deploy any portion of the adaptor on the back-end memory. Third, the generic adaptor is transparent to existing applications. Fourth, the generic adaptor supports object model customization flexibility through the use of a variety of customizable OData-compliant tools. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The disclosure generally describes computer-implemented methods, software, and systems for allowing provisioning of OData services on top of a GenIL layer. For the purposes of this disclosure, a business suite is a bundle of business applications that provide integration of information and processes, collaboration tools, industry-specific functionality, and scalability. The business suite provides the delivery of end-to-end business processes which span organizational boundaries such as business departments and locations, integrates business partners such as customers, suppliers, and service providers, and allows an organization to align business plans, budgets, and operational reports. With only a web browser, business suite users can begin work once they have been authenticated, offering a single point of access to information, functionality, and services. The business suite may present information from diverse sources in a unified and structured way, and provide additional services, such as dashboards, an internal search engine, e-mail, news, navigation tools, and various other features. The business suite is often used by enterprises to providing their employees, customers, and possibly additional users with a consistent look and feel, and access control and procedures for multiple applications, which otherwise would have been separate entities altogether.

Generally, through a graphical user interface (GUI), a business suite user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Figure 1:
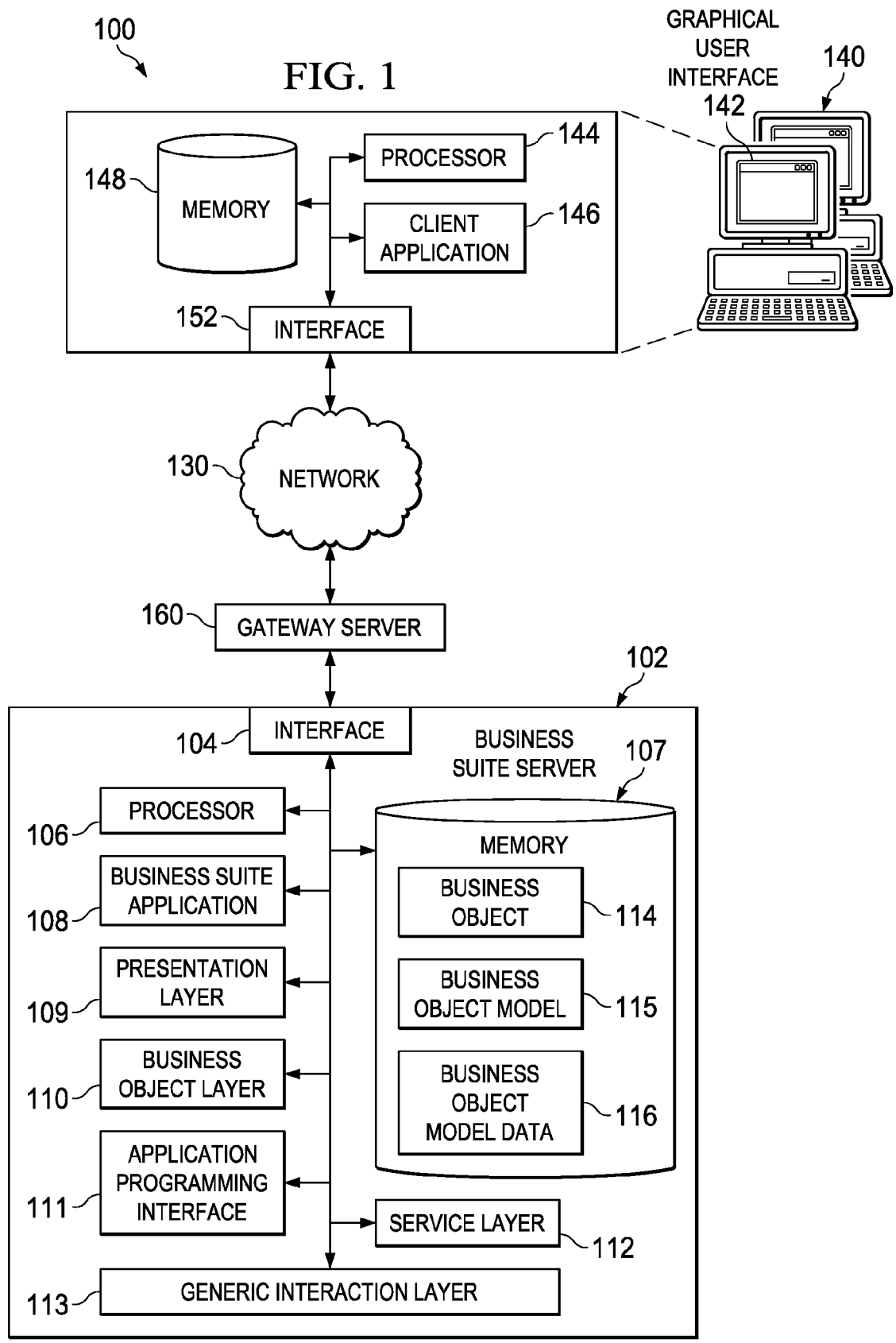
FIG. 1 is a block diagram illustrating an example system for allowing provisioning of OData services on top of a GenIL layer.

FIG. 1 illustrates an example distributed computing system 100 operable to allow provisioning of OData services on top of a GenIL layer. Specifically, the illustrated example distributed computing system 100 includes or is communicably coupled with an business suite server 102 and a client 140 that communicate across a network 130.

In general, the business suite server 102 is a server that stores one or more business applications 108, where at least a portion of the business applications 108 are executed via requests and responses sent to users or clients within and communicably coupled to the illustrated example distributed computing system 100. In some implementations, the business suite server 102 may store a plurality of various business applications 108. In other implementations, the business suite server 102 may be a dedicated server meant to store and execute only a single business application 108. In some implementations, the business suite server 102 may comprise a web server, where the business applications 108 represent one or more web-based applications accessed and executed by the client 140 via the network 130 or directly at the business suite server 102 to perform the programmed tasks or operations of the business application 108.

At a high level, the business suite server 102 comprises an electronic computing device operable to receive, transmit, process, store, or manage data and information associated with the example distributed computing system 100. Specifically, the business suite server 102 illustrated in FIG. 1 is responsible for receiving application requests, for example business suite navigation requests, from one or more client applications associated with the client 140 of the example distributed computing system 100 and responding to the received requests by processing said requests in the associated business application 108, and sending the appropriate response from the business application 108 back to the requesting client application 146. In addition to requests from the client 140, requests associated with the business applications 108 may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single business suite server 102, environment 100 can be implemented using two or more servers 102, as well as computers other than servers, including a server pool. Indeed, business suite server 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated business suite server 102 may be adapted to execute any operating system, including Linux, UNIX, Windows, Mac OS, Java, Android, iOS or any other suitable operating system. According to one implementation, business suite server 102 may also include or be communicably coupled with an e-mail server, a web server, a caching server, a streaming data server, and/or other suitable server.

The business suite server 102 also includes an interface 104, a processor 106, and a memory 107. The interface 104 is used by the business suite server 102 for communicating with other systems in a distributed environment—including within the environment 100—connected to the network 130; for example, the client 140, as well as other systems communicably coupled to the network 130 (not illustrated). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated example distributed computing system 100.

As illustrated in FIG. 1, the business suite server 102 includes a processor 106. Although illustrated as a single processor 106 in FIG. 1, two or more processors may be used according to particular needs, desires, or particular implementations of the environment 100. Each processor 106 may be a central processing unit (CPU), a blade, an application specific integrated circuit (ASIC), a field-programmable gate array (FPGA), or another suitable component. Generally, the processor 106 executes instructions and manipulates data to perform the operations of the business suite server 102. Specifically, the processor 106 executes the functionality required to receive and respond to requests from the client 140 and/or allowing provisioning of OData services on top of a GenIL layer.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Objective C, Java, Visual Basic, assembler, Perl, any suitable version of 4GL, as well as others. While portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

The business suite server 102 also includes a memory 107, or multiple memories 107. The memory 107 may include any type of memory or database module and may take the form of volatile and/or non-volatile memory including, without limitation, magnetic media, optical media, random access memory (RAM), read-only memory (ROM), removable media, or any other suitable local or remote memory component. The memory 107 may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto associated with the purposes of the business suite server 102. Additionally, the memory 107 may include any other appropriate data, such as VPN applications, firmware logs and policies, firewall policies, a security or access log, print or other reporting files, as well as others. While memory 107 is illustrated as in integral component of the business suite server 102, in alternative implementations memory 107 can be external to the business suite server 102 and/or the example distributed computing system 100.

The business suite server 102 further includes an application programming interface (API) 111. The API 111 may include specifications for routines, data structures, and object classes. The API 111 may be either computer language independent or dependent and refer to a complete interface, a single function, or even a set of APIs. In some implementations, the API 111 can be used to interface between the business application 108 and/or one or more components of the business suite server or other components of the example distributed computing system 100, both hardware and software. For example, in one implementation, the business application 108 can utilize API 111 to communicate with the client 140. Although the API 111 is shown as a stand-alone component within the business suite server 102, there may be multiple other APIs in the example distributed computing system 100 that are integrated into or accessible by individual components, both hardware and software.

The service layer 112 provides software services to the example distributed computing system 100. The functionality of the business suite system may be accessible for all service consumers via this service layer. Software services, such as business suite navigation, provide reusable, defined business functionalities through a defined interface. The defined interface may be software written in extensible markup language (XML) or other suitable language. While illustrated as an integrated component of the business suite server 102 in the example distributed computing system 100, alternative implementations may illustrate the service layer 112 as a stand-alone component in relation to other components of the example distributed computing system 100. Moreover, any or all parts of the service layer 112 may be implemented as child or sub-modules of another software module or enterprise application (not illustrated) or of another hardware module (not illustrated) without departing from the scope of this disclosure.

The memory 107, i.e., a back-end data system, holds data for the business suite server 102. In some implementations, the memory 107 includes a business object 114, business object model 115, and business object model data 116. Although illustrated as single instances, there may be more than one instance of the business object 114, business object model 115, and business object model data 116.

The business object 114 can be considered a representation of an intelligible business/non-business entity, such as an account, an order, employee, an invoice, a financial report, etc. The business object 114 may encompass both functions, for example in the form of methods, and data, such as one or more properties. For example, an account business object 114 may have properties such as Name, Priority, Value, etc. Business objects 114 may reduce system complexity by reducing a system into smaller units. The implementation details of business objects 114 are typically hidden from a non-development user and may be accessed through the defined functions and encapsulated data. Business objects 114 also form a point of entry of the functions and data of a system and enable the system to easily share, communicate, display, or otherwise operate with other systems. A business object 114 may also be considered the target of a request for data in a particular business suite, for example through a web page, and may contain a view to be displayed when the business object 114 is accessed. In some implementations, the business object 114 can control the location of a selected view, personalized views for a specific business suite user, and dynamic views. While illustrated as integrated with memory 107 of the business suite server 102 in the example distributed computing system 100, in alternative implementations the business object 114 can be stored external to the business suite server 102.

The business object model 115 is a structured way of representing relationships, associations, roles, etc. of business objects 114 applicable to an organization. For example, the business object model may be represented through the use of an entity-relationship diagram (ERD) or other suitable diagram or descriptive method. An example a business object model 115 for ProductSeller may include root business objects 114 such as Account and Order, each of which may contain their own methods, properties, and relationships to other dependent objects in the business object model 115. The root business objects 114 may also have associations with other dependent business objects 114. Examples of a dependent object for the Account root business object 114 may include AccountAddressUS. Example dependent objects for the Order rood business object 114 may include OrderPartner and OrderItemShipmentData. While illustrated as integrated with memory 107 of the business suite server 102 in the example distributed computing system 100, in alternative implementations the business object model 115 can be stored external to the business suite server 102.

The business object model data 116 is data associated with a specific instance of a business object 114. For example, for the example AccountAddressUS dependent object above, there may be properties Name, Title, Address1, Address2, City, State, and PostalCode. Business object data 116 would be the data associated with each property, for example, Name="XYZ, Inc.", Address1="12345 Any Street", Address2="Suite ABC", City="Some City", etc. In some implementations, the business object model data 116 may include, among other things: text, images, sounds, videos, and animations. While illustrated as integrated with memory 107 of the business suite server 102 in the example distributed computing system 100, in alternative implementations the business object model data 116 can be stored external to the business suite server 102.

Figure 2:
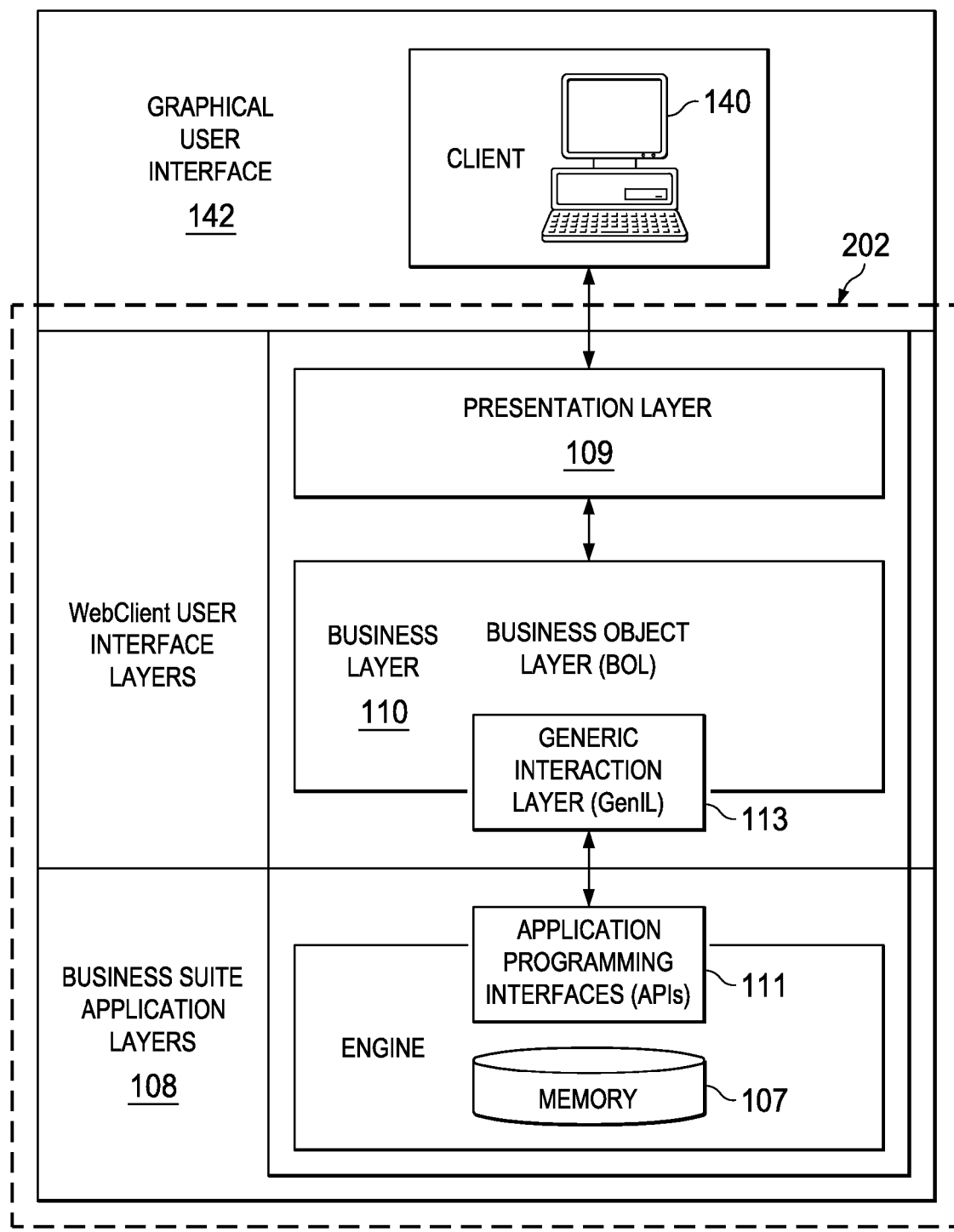
FIG. 2 is a block diagram illustrating a client GUI multi-tier architecture.

Turning now to FIG. 2, FIG. 2 is a block diagram 200 illustrating a client GUI multi-tier architecture 200. Access to the business suite server 102, as indicated within dashed line 202, is provided through a client 140 (described below), for example a web browser or other suitable GUI application interfacing with a user interface (UI) presentation layer 109 that further interfaces with an application programming interface (API) (not illustrated) provided by a business objects layer (BOL) 110. From this point on, the presentation layer 109 and the business objects layer 110 will collectively be referred to as the BOL 110. The BOL 110 APIs provide a consistent interface for a GUI application to access business objects 114 associated with the business application 108.

Associated with the BOL 110 is a generic interaction layer (GenIL) 113 which provides a consistent interface for the BOL 110 to access business application 108 business objects 114 through APIs 111 and for the business application 108 to return data to the client 140. At a high-level, GenIL 113 acts as a bridge between the client 140 and the business application 108. Because of this architecture, the client 140 is not affected by changes to the underlying business application 108 business objects 114 as long as the BOL 110/GenIL 113/APIs 111 interface(s) does not change. This architecture also generally ensures that changes to a particular layer, API, etc. can also be isolated from affecting other layers, APIs, etc.

Open Data Protocol (OData) is a web protocol for querying and updating data and allows for a user to request data from a data source over the Hypertext Transfer Protocol and receive results back from the data source in formats such as Atom Publishing Protocol (Atom), Javascript Object Notation (JSON), Extensible Markup Language (XML), etc. In some implementations, the request may be divided into multiple segments. In some implementations, the multiple request segments may made and/or received concurrently and/or in parallel. Mobile computing and other computing platforms, such as smartphones and tablet computers, can use OData and are an increasingly important method of access to business suite information. To provide access to the business suite server 102 using OData-compliant computing platforms, an OData-GenIL Adaptor (OGA) is used to at least provide pre-runtime object model mapping and runtime conversion of data associated with the mapped object model.

In some implementations, the OGA can be implemented as software and/or hardware and may include one or more software and/or hardware modules to provide the pre-runtime object model mapping and runtime conversion of data services.

Model Mapping

Figure 3A:
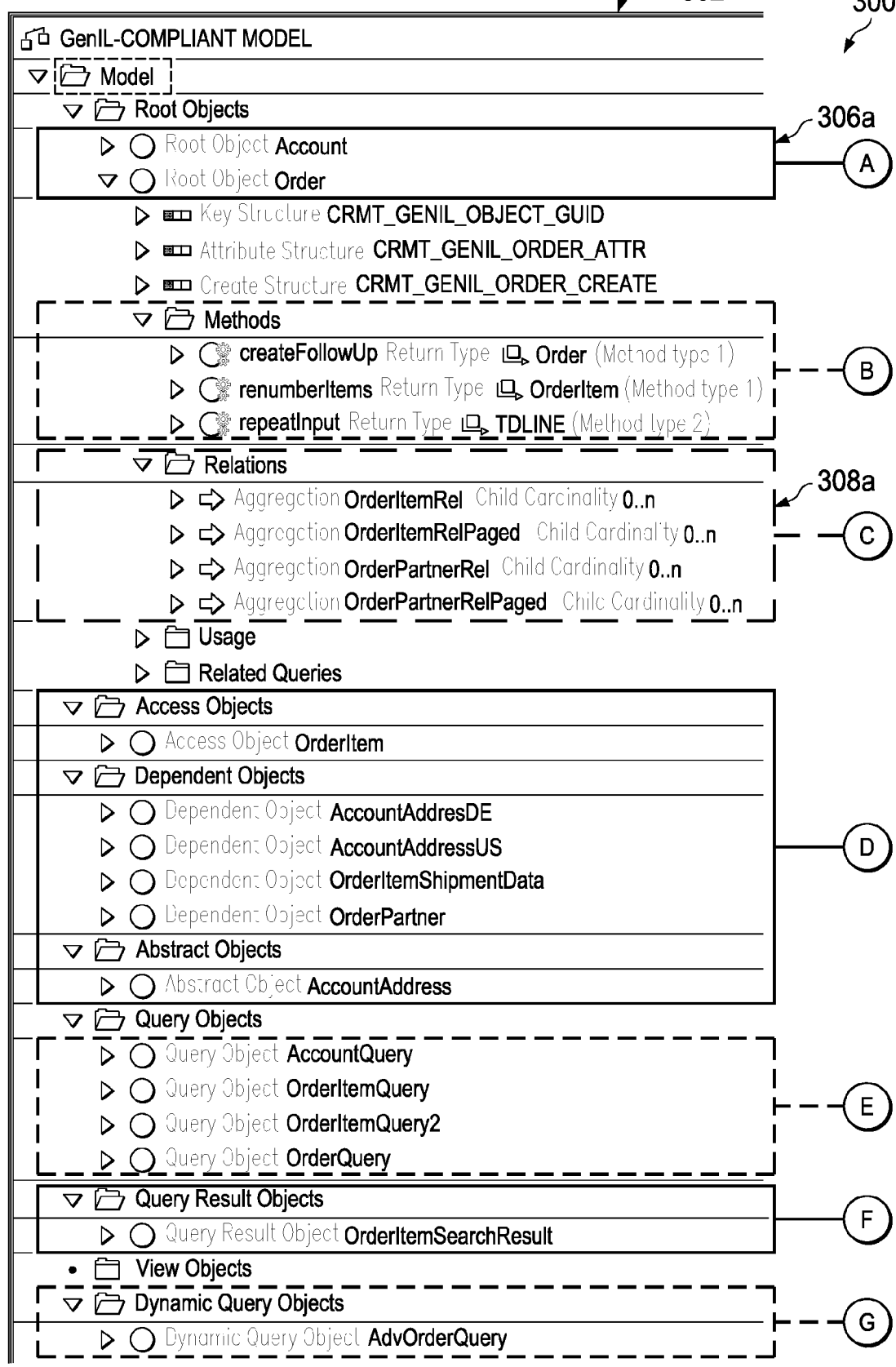
FIGS. 3A-3B illustrate an example of a mapping of an object model from a GenIL-compliant format to an OData-compliant format.
Figure 3B:
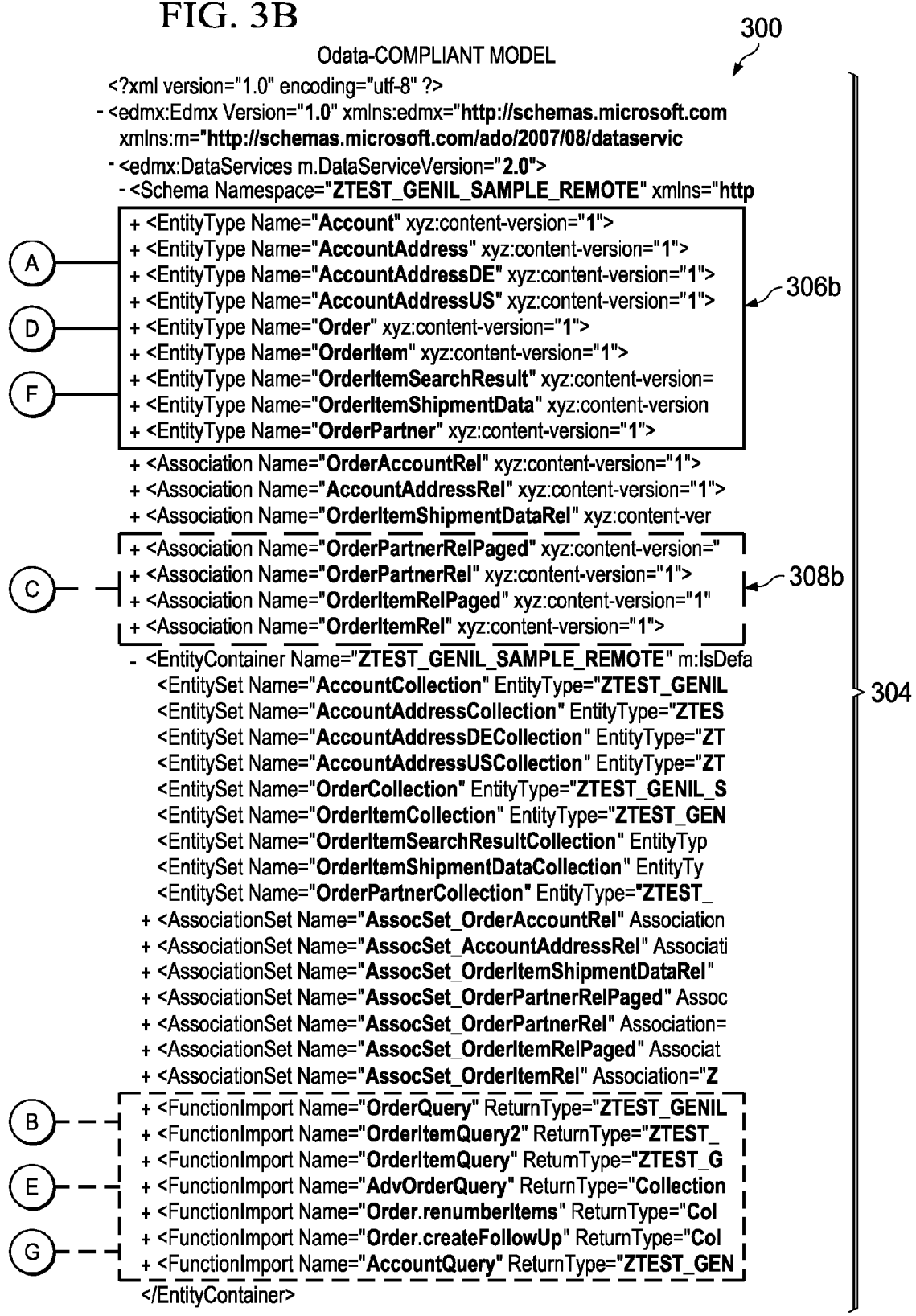

Turning now to FIGS. 3A-3B, FIGS. 3A-3B illustrate an example 300 of a pre-runtime mapping by the OGA of an object model, for example the object model ProductSeller described above, from a GenIL-compliant format 302, here in an advanced business application programming (ABAP) language, to an OData-compliant model 304, here in XML as shown by the header "<?xml version="1.0" encoding="utf-8"?>". For example, if prior to runtime a particular client 140 requests to view and/or edit the ProductSeller business object model 115, the OGA will convert the GenIL-compliant model 302 retrieved from the memory 107 to an OData-compliant model 304 to transmit the particular client 140. In the example conversion, the GenIL-compliant model 302 "Root" objects are mapped to an OData-compliant XML "EntityType" 306b. Likewise, the GenIL-compliant "Aggregation" relations 308a are mapped to an OData-compliant XML "Association" 308b. As will be apparent to one of ordinary skill, there are multiple possible mappings apart from the examples shown. In some implementations, the mapping is done automatically, while in other implementations, client 140 input through a GUI may be required to complete the mapping. In some implementations, the mapping can be bi-directional. In some implementations, the GenIL-compliant model 302 and/or the OData-compliant model 304 may be pre-processed and/or post-processed as part of the mapping between the model formats.

Conversion of Runtime Data

Once the object model has been mapped by the OGA, a request by client 140 for runtime data associated with the mapped object model will, at a high-level, be requested from the memory 107, converted by the OGA from a GenIL format, for example ABAP, to an OData-compliant format, for example XML, and returned to the client 140. For example, if a particular client 140 requests all orders from accounts with Name="XYZ, Inc." between January 1 to March 31, a request is made by the OGA to memory 107 to retrieve the applicable runtime data corresponding to the mapped data model 304. The returned runtime data, if any, is converted from a GenIL-compliant format to an OData-compliant format and returned to the client 140. In some implementations, the conversion is done automatically, while in other implementations, client 140 input through a GUI may be required to complete the conversion. In some implementations, the conversion is bi-directional. In some implementations, the GenIL-compliant runtime data and/or the OData-compliant runtime data may be pre-processed and/or post-processed as part of the conversion. In some implementations, runtime data can be requested and converted prior to or in the absence of a mapping of a data model. In some implementations, requests for and/or processing of runtime data can be different depending upon whether the runtime data is associated with a root object or with a dependent object and/or single or multiple data sets are requested. In some implementations, OData requests for and/or processing of runtime data generated by client 140

GUI actions, for example pressing a GUI button, selecting a menu item, generating a navigation request, etc., can be different depending upon the specific client 140 GUI action and/or whether the client 140 GUI action calls a method and/or generates a query/dynamic query.

The OGA may be implemented in various ways within the example distributed computing system 100. In one implementation, the OGA can be incorporated into the gateway server 160. In another implementation, the OGA can be incorporated into the business suite server 102.

OData-GenIL Adaptor Incorporated into a Gateway Server

Mobile computing platforms may access the business suite server 102 through the gateway server 160. The gateway server 160 provides a defined API and acts as an interface/gateway between a client 140 and the business suite server 102. In some implementations, the gateway server 160 can communicate with clients 140 using OData through hypertext transfer protocol (HTTP) or hypertext transfer protocol secure (HTTPS) requests. In some implementations, the gateway server can use a remote function call (RFC) interface to communication with ABAP and/or non-ABAP programs. In some implementations, the gateway server 160 can be stand-alone. In some implementations, the gateway server 160 can be incorporated into any component of the example distributed computing system 100. In some implementations the gateway server may be a hardware server, a software server, and/or a virtual server. In some implementations, the gateway server 160 can be part of a web server, a streaming server, an RSS server, or other suitable server.

Figure 4:
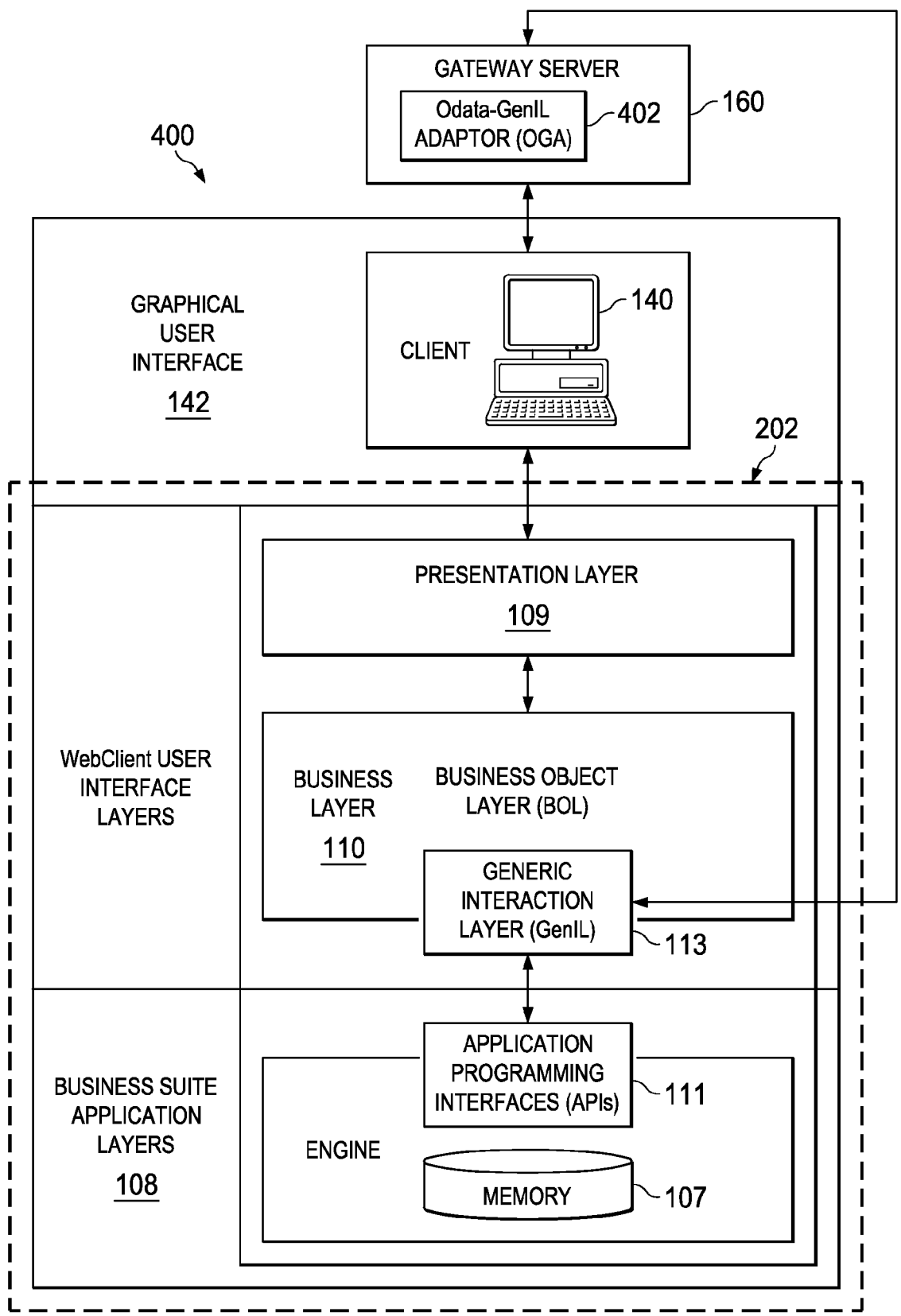
FIG. 4 is a block diagram illustrating an updated client GUI multi-tier architecture with a GenIL-OData adaptor incorporated into a gateway server.

Turning now to FIG. 4, FIG. 4 is a block diagram 400 illustrating an updated client GUI multi-tier architecture with the OGA 402 incorporated into the gateway server 160. At a high-level, the gateway server 160 receives OData-compliant requests from client 140 and using the OGA 402, the gateway server 160 converts the OData-compliant request into a GenIL-compliant request and communicates the request to the BOL 110 using the GenIL 113. BOL 110 receives data responsive to the OData request from the GenIL 113 and transmitted to the OGA 402. The OGA 402 converts the received data to OData-compliant data. The gateway server 160 transmits the converted OData-compliant data to the client 140. While FIG. 4 illustrates the OGA 402 as integrated with gateway server 160, in alternative implementations, all or portions of the OGA 402 can be implemented in other components of the example distributed computing system 100 or the OGA 402 can interface with the gateway server 106 as a stand-alone component.

Figure 5:
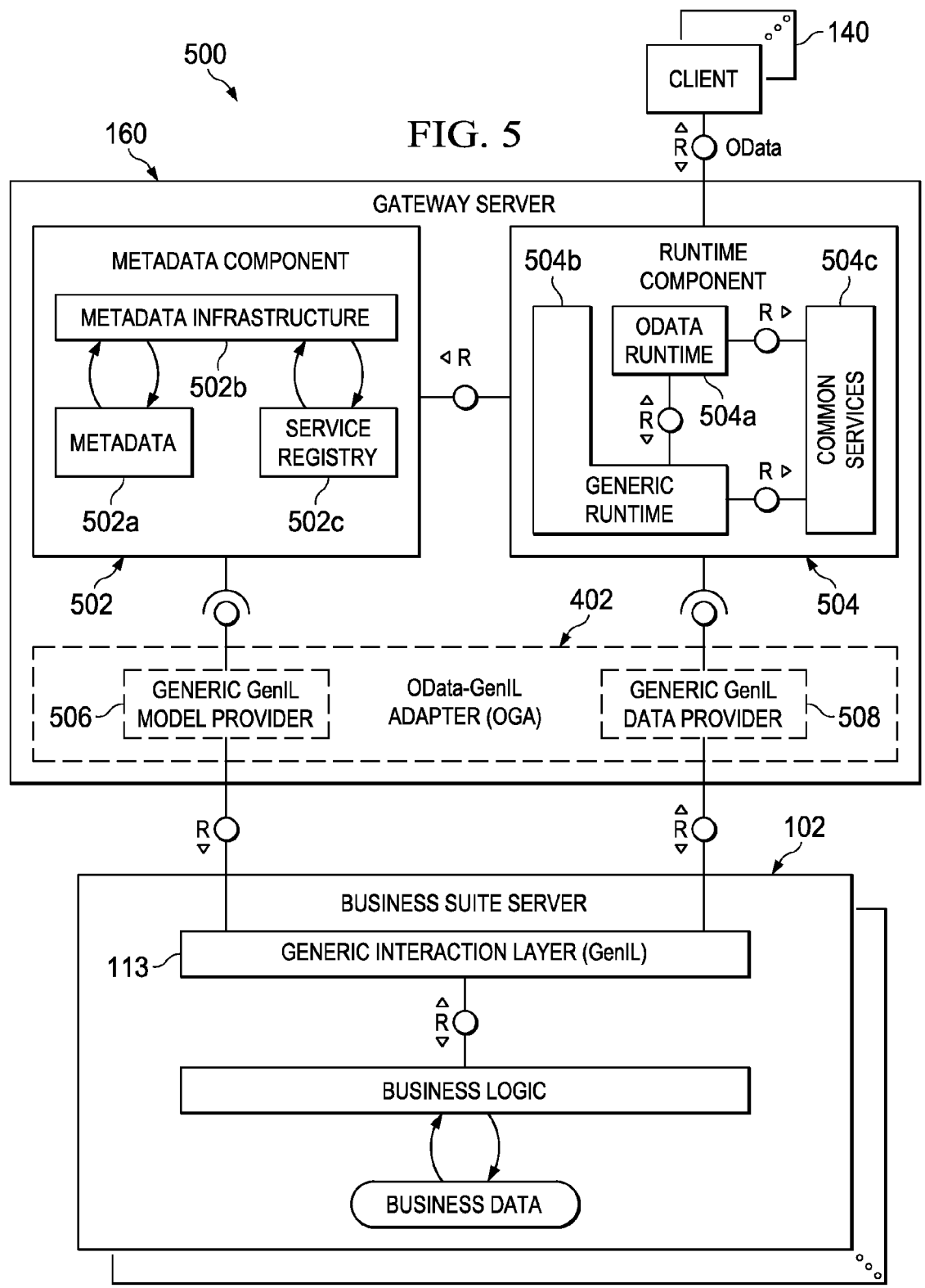
FIG. 5 is a block diagram illustrating the architecture of a gateway server including a GenIL-OData adaptor.

Turning now to FIG. 5, FIG. 5 is a block diagram 500 illustrating the architecture of the gateway server 160 and the OGA 402 incorporated within the gateway server 160. The gateway server 160 includes metadata component 502, runtime component 504, and the OGA 402. The runtime component 504 also determines which business add-in (BADI) to use to load a requested object model from the BOL 110. In some implementations, BADIs are supplied by a client. In other implementations, BADIs are supplied by the gateway server owner.

The metadata component 502 manages metadata 502*a* within the gateway server 160. The metadata 502*a* describes OData models that are exposed as OData service documents and OData metadata documents. The metadata 502 may contain references to object models. The metadata infrastructure 502*b* manages access to gateway server 160 content bases upon metadata 502*a*, exposes the standardized description of OData services by assembling OData service documents and metadata documents from internal and external sources. The service registry 502*c* is a data store storing a linkage between a particular OData service and an actual implementation of the particular OData service.

The runtime component 504 analyzes and processes requests from client 140. In some implementations, the runtime component 504 embeds features such as automatic logging and tracing, configuration-based routing, transaction handling, etc. In some implementations, some common services 504*c* can be offered using an API for reuse by an OData runtime 504*a*. Examples of common services 504*c* may include metering services for enabling usage-based charging and push service notifications. The OData runtime 504*a* contains functionality required to exposes OData services. The generic runtime 504*b* processes protocol-agnostic gateway server 160 content. The generic runtime 504*b* remains stateless between individual requests and access to backend memories.

The OGA 402 includes a model provider for GenIL 506 and a business data provider for GenIL 508. The generic GenIL model provider 506 transforms a GenIL-compliant model to an OData-compliant model and vice versa. A generic GenIL data provider 508 connects with the GenIL 113 and reads/processes data associated with an object model.

Figure 6:
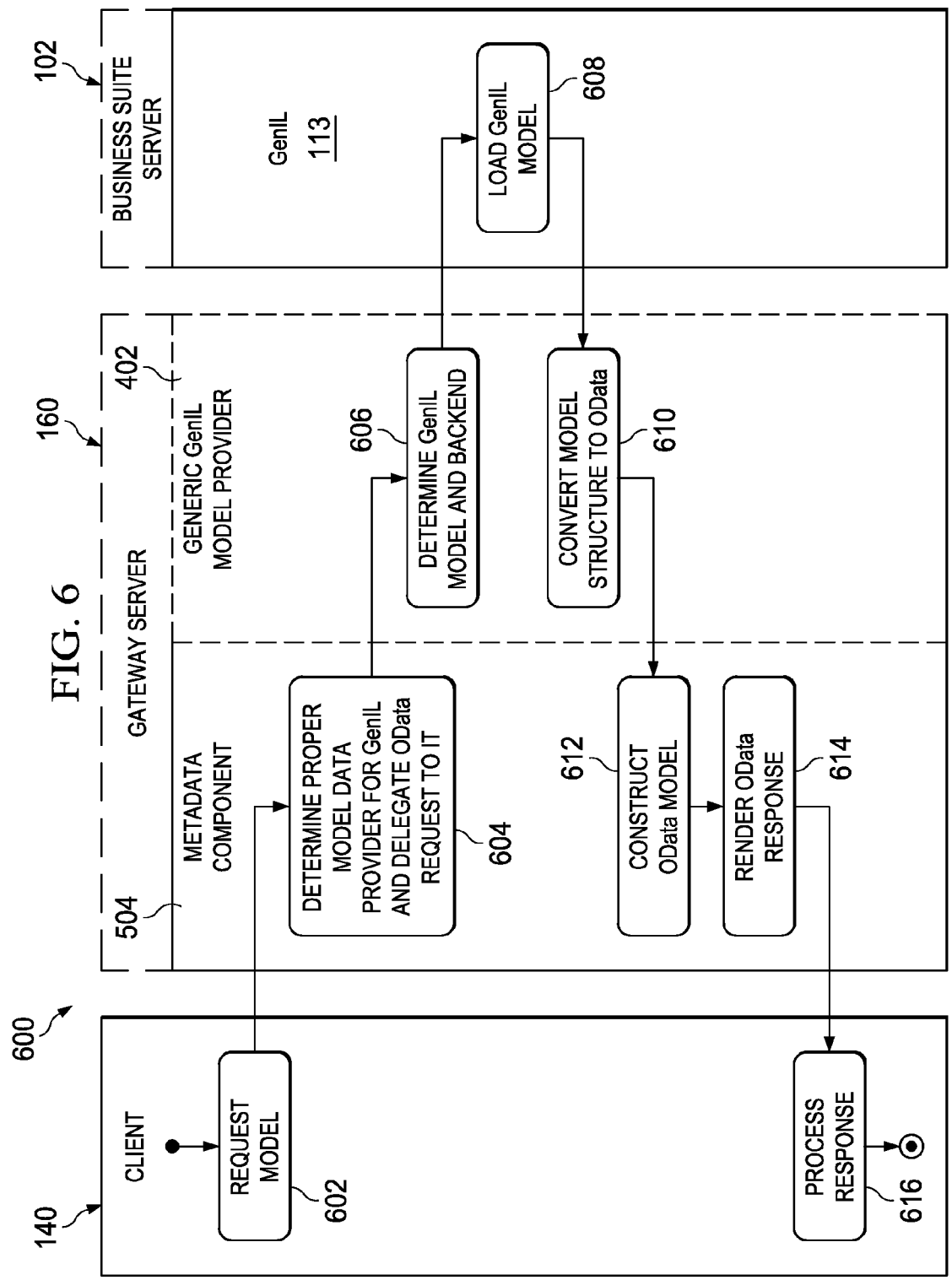
FIG. 6 is a flow chart for mapping a requested object model from a GenIL compliant format to an OData-compliant format with the GenIL-OData adaptor incorporated into the gateway server.

Turning now to FIG. 6, FIG. 6 is a flow chart 600 for mapping a requested object model from a GenIL-compliant format to an OData-compliant format with the GenIL-OData Adaptor incorporated into the gateway server. For clarity of presentation, the description that follows generally describes method 600 in the context of FIGS. 1, 4, and 5. However, it will be understood that method 600 may be performed, for example, by any other suitable system, environment, software, and hardware, or a combination of systems, environments, software, and hardware as appropriate. For example, one or more of the business suite server, the client, or other computing device (not illustrated) can be used to execute method 600 and obtain any data from the memory of the client, the business suite server, or the other computing device (not illustrated).

At 602, an OData-compliant request is made by a client to a gateway server for an object model. From 602, method 600 proceeds to 604.

At 604, the metadata component of the gateway server receives the client-initiated OData-compliant request. The metadata component determines the proper model data provider for GenIL and delegates the request to it. In some implementations, the model data provider for GenIL can be a BADI. The determined BADI requests the client-requested object model from the OGA. From 604, method 600 proceeds to 606.

At 606, the OGA receives the BADI-initiated request for the client-requested object model. The OGA determines the client-requested object model and the location of the client-requested object model at the business suite back-end memory. The OGA requests the client-requested object model from the GenIL with a GenIL-compliant request. From 606, method 600 proceeds to 608.

At 608, the GenIL receives the OGA-initiated request for the client-requested object model. The GenIL loads the object model from the business suite server back-end memory. The GenIL transmits the loaded object model to the OGA. From 608, method 600 proceeds to 610.

At 610, the OGA receives the GenIL-loaded object model from the GenIL. The OGA converts the received object model to OData and transmits the OData to the metadata component of the gateway server. From 610, method 600 proceeds to 612.

At 612, the metadata component of the gateway server receives the OGA-converted OData from the OGA. The metadata component of the gateway server constructs an OData-compliant model from the received OData. From 612, method 600 proceeds to 614.

At 614, the metadata component of the gateway server renders an OData-compliant response with the constructed OData-compliant model. The metadata component transmits the rendered OData-compliant response to the client. From 614, method 600 proceeds to 616.

At 616, the client receives the metadata-component-rendered OData response containing the constructed OData object model. The client processes the received OData response. After 616, method 600 stops.

Figure 7:
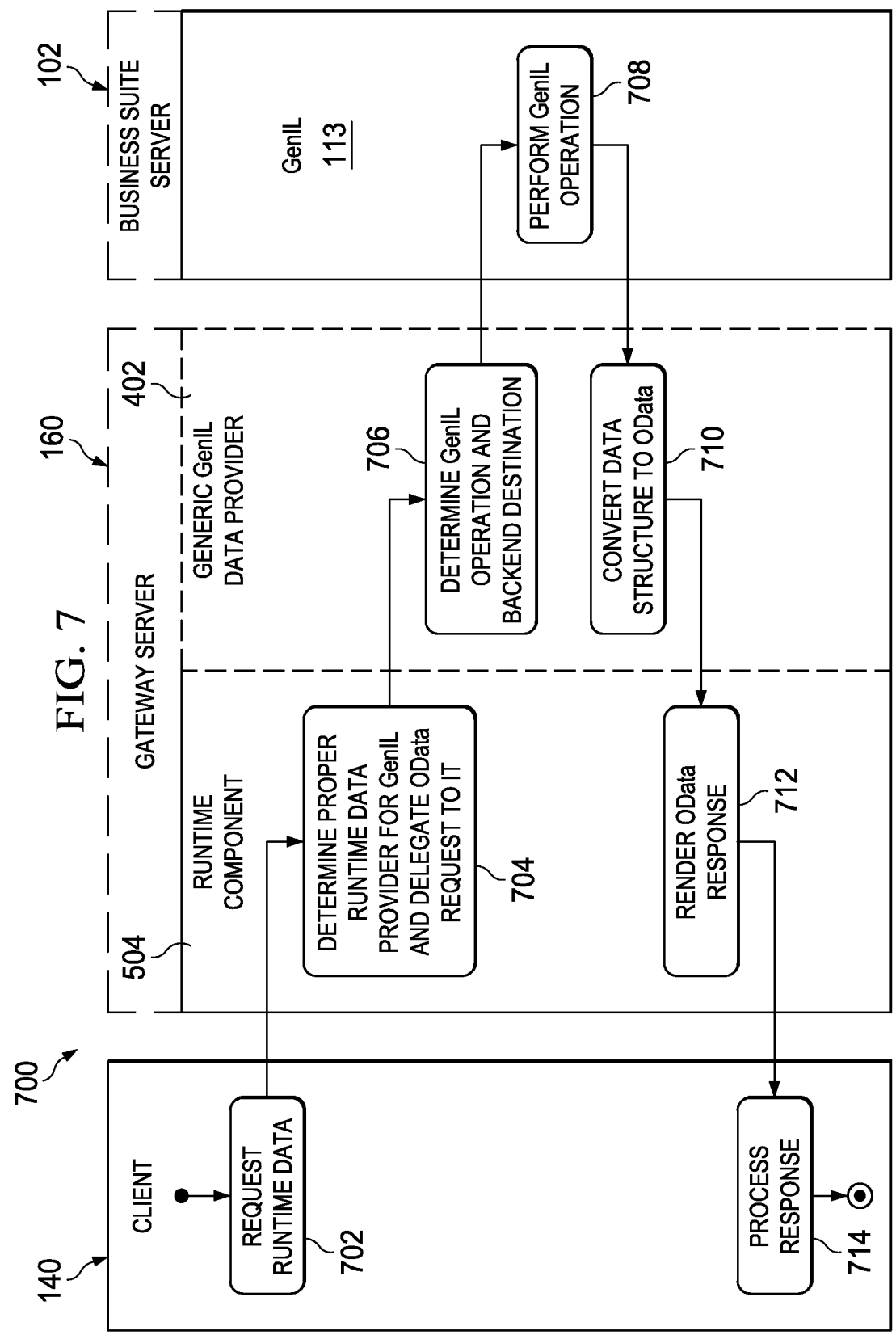
FIG. 7 is a flow chart for converting runtime data associated with an object model mapped from a GenIL-compliant format to an OData-compliant format with the GenIL-OData adaptor incorporated into the gateway server.

Turning now to FIG. 7, FIG. 7 is a flow chart 700 for converting runtime data associated with an object model mapped from a GenIL-compliant format to an OData-compliant format with the GenIL-OData Adaptor incorporated into the gateway server. For clarity of presentation, the description that follows generally describes method 700 in the context of FIGS. 1, 4, and 5. However, it will be understood that method 700 may be performed, for example, by any other suitable system, environment, software, and hardware, or a combination of systems, environments, software, and hardware as appropriate. For example, one or more of the business suite server, the client, or other computing device (not illustrated) can be used to execute method 700 and obtain any data from the memory of the client, the business suite server, or the other computing device (not illustrated).

At 702, an OData-compliant request is made by a client to a gateway server for runtime data associated with an object model. From 702, method 700 proceeds to 704.

At 704, the runtime component of the gateway server receives the client-initiated OData-compliant request. The runtime component determines the proper runtime data provider for GenIL and delegates the request to it. In some implementations, the runtime data provider for GenIL can be a BADI. The determined runtime data provider for GenIL requests the client-requested runtime data from the OGA. From 704, method 700 proceeds to 706.

At 706, the OGA receives the BADI-initiated request for the client-requested runtime data. The OGA determines the client-requested runtime data and the location of the client-requested runtime data at the business suite back-end memory. The OGA requests the client-requested runtime data from the GenIL with a GenIL-compliant request. From 706, method 700 proceeds to 708.

At 708, the GenIL receives the OGA-initiated request for the client-requested runtime data. The GenIL loads the runtime data from the business suite server back-end memory. The GenIL transmits the loaded runtime data to the OGA. From 708, method 700 proceeds to 710.

At 710, the OGA receives the GenIL-loaded runtime data from the GenIL. The OGA converts the received runtime data to OData and transmits the OData to the runtime component of the gateway server. From 710, method 700 proceeds to 712.

At 712, the runtime component of the gateway server renders an OData-compliant response with the constructed OData-compliant runtime data. The runtime component transmits the rendered OData-compliant response to the client. From 712, method 700 proceeds to 714.

At 714, the client receives the runtime-component-rendered OData response containing the OData runtime data. The client processes the received OData response. After 714, method 700 stops.

OData-GenIL Adaptor Incorporated into a Business Suite Server

Figure 8:
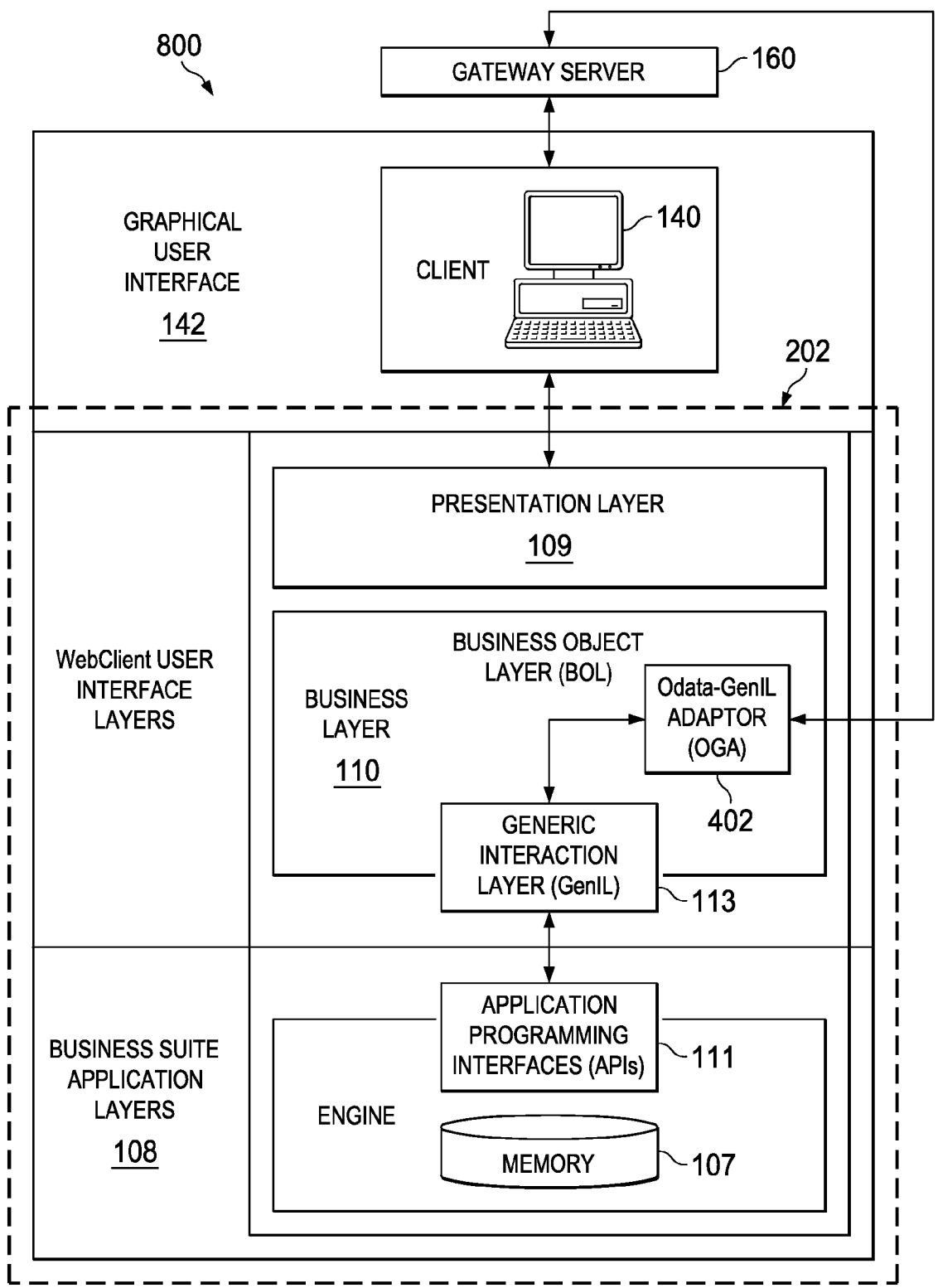
FIG. 8 is a block diagram illustrating an updated client GUI multi-tier architecture with a GenIL-OData Adaptor incorporated into the business suite server.

Turning now to FIG. 8, FIG. 8 is a block diagram 800 illustrating an updated client GUI multi-tier architecture with the OGA 402 incorporated into the business suite server 102. At a high-level, the gateway server 160 receives OData-compliant requests from client 140 and transmits the OData-compliant request to the BOL 110. The OGA 402 converts the OData-compliant request into a GenIL-compliant request and communicates the request to the BOL 110. BOL 110 receives data responsive to the OData-compliant request from the GenIL 113 and transmits the received data to the OGA 402. The OGA 402 converts the received data to OData-compliant data. The OData-compliant data is transmitted to the gateway server 160 and from the gateway server 160 the client 140. While FIG. 8 illustrates the OGA 402 as integrated with the business suite server 102, in alternative implementations, all or portions of the OGA 402 can be implemented in other components of example distributed computing system 100 or the OGA 402 can interface with the business suite server 102 as a stand-alone component.

Figure 9:
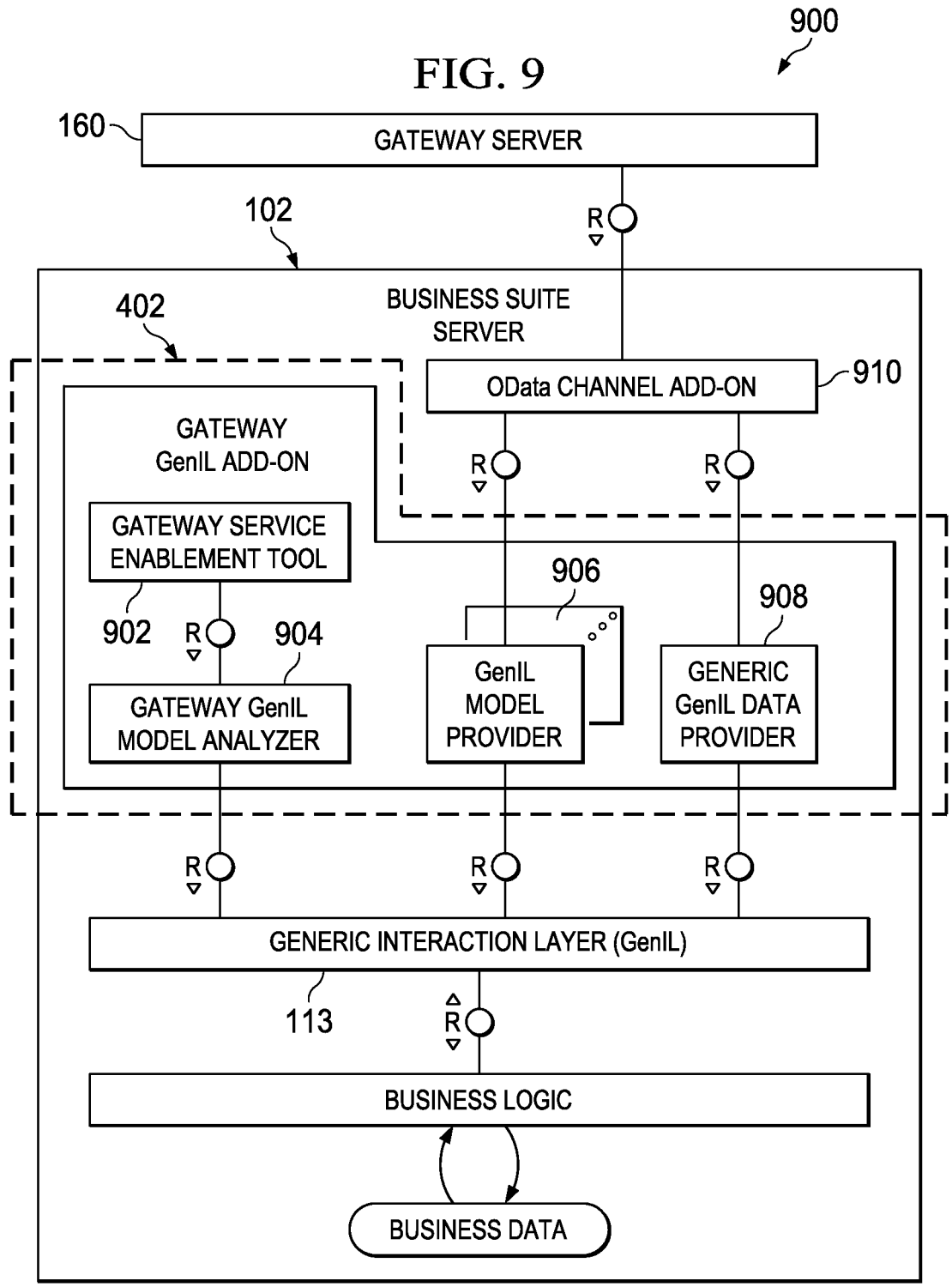
FIG. 9 is a block diagram illustrating the architecture of the business suite server with an GenIL-OData Adaptor incorporated within the business suite server.

Turning now to FIG. 9, FIG. 9 is a block diagram 900 illustrating the architecture of the business suite server 102 with the OGA 402, as indicated within the dashed line, as incorporated within the business suite server 102. The OGA 402 includes a gateway service enablement tool 902, gateway GenIL model analyzer 904, GenIL model provider 906, and generic GenIL data provider 908.

The gateway service enablement tool 902 reads GenIL-compliant/OData-Compliant model information, analyzes the read information using the gateway GenIL model analyzer 904, and generates a corresponding OData-compliant/GenIL-compliant model, respectively. The generic GenIL model provider 906 transforms a GenIL-compliant model to an OData-compliant model and vice-versa. A generic GenIL data provider 908 connects with the GenIL 113 and reads/processes data associated with an object model. The OData channel add-on 910 is a gateway server 160 add-on for backend memory enablement and provisioning allowing OData channel development.

Figure 10:
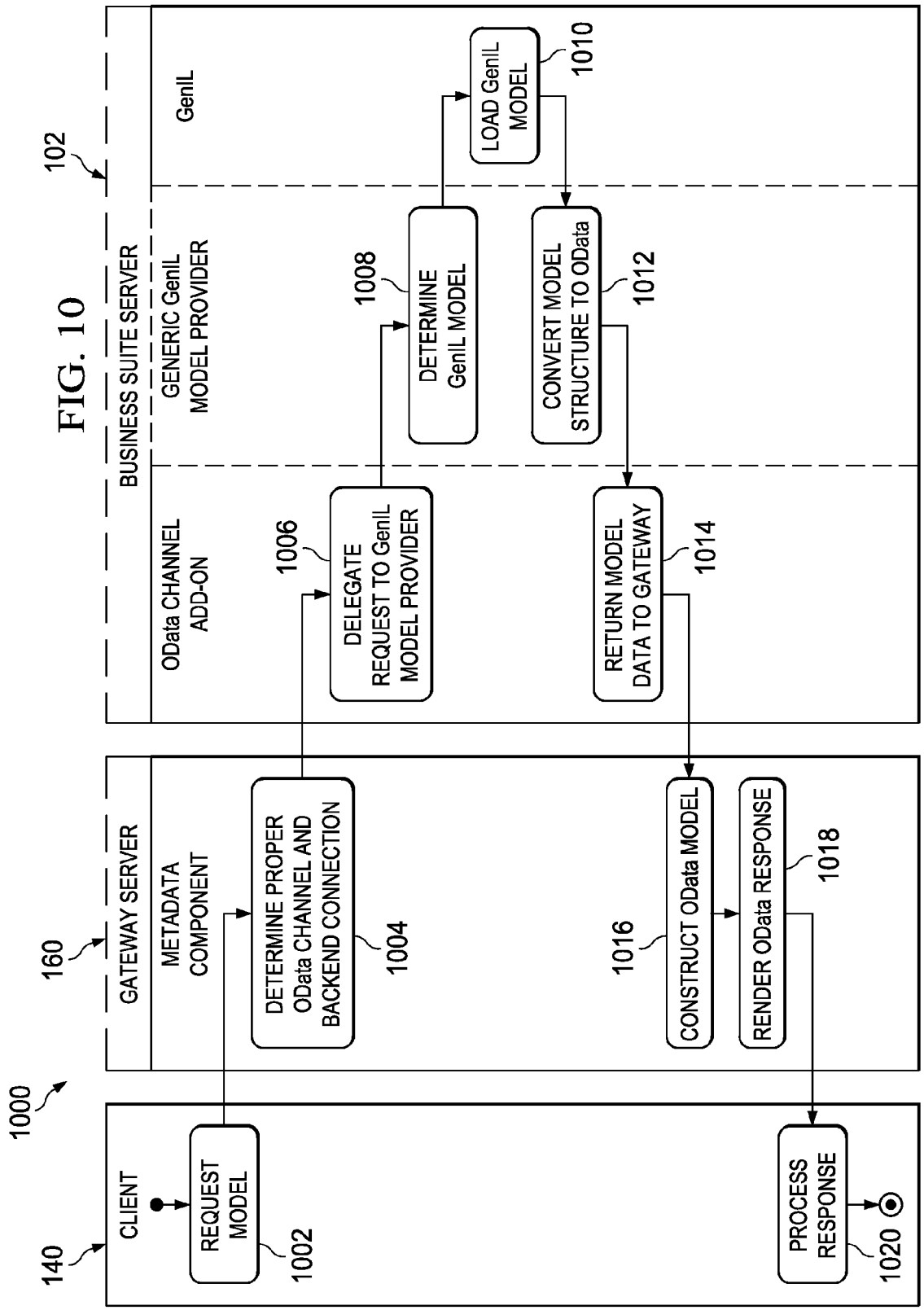
FIG. 10 is a flow chart for mapping a requested object model from a GenIL-compliant format to an OData-compliant format with the GenIL-OData adaptor incorporated into the business suite server.

Turning now to FIG. 10, FIG. 10 is a flow chart 1000 for a mapping of a requested object model from a GenIL-compliant format to an OData-compliant format with the GenIL-OData Adaptor incorporated into the business suite server. For clarity of presentation, the description that follows generally describes method 1000 in the context of FIGS. 1, 8, and 9. However, it will be understood that method 1000 may be performed, for example, by any other suitable system, environment, software, and hardware, or a combination of systems, environments, software, and hardware as appropriate. For example, one or more of the business suite server, the client, or other computing device (not illustrated) can be used to execute method 1000 and obtain any data from the memory of the client, the business suite server, or the other computing device (not illustrated).

At 1002, an OData-compliant request is made by a client to a gateway server for an object model. From 1002, method 1000 proceeds to 1004.

At 1004, the metadata component of the gateway server receives the client-initiated OData-compliant request. The metadata component determines the proper model data provider for GenIL and delegates the request to it. In some implementations, the model data provider for GenIL can be a BADI. The determined BADI requests the client-requested object model from the OData channel add-on. From 1004, method 1000 proceeds to 1006.

At 1006, the OData channel add-on receives the BADI-initiated request for the client-requested object model and forwards the request to the OGA. From 1006, method 1000 proceeds to 1008.

At 1008, the OGA determines the client-requested object model and the location of the client-requested object model at the business suite back-end memory. The OGA requests the client-requested object model from the GenIL with a GenIL-compliant request. From 1008, method 1000 proceeds to 1010.

At 1010, the GenIL receives the OGA-initiated request for the client-requested object model. The GenIL loads the object model from the business suite server back-end memory. The GenIL transmits the loaded object model to the OGA. From 1010, method 1000 proceeds to 1012.

At 1012, the OGA receives the GenIL-loaded object model from the GenIL The OGA converts the received object model to OData and transmits the OData to the OData channel add-on. From 1012, method 1000 proceeds to 1014.

At 1014, the OData channel add-on transmits the OData to the metadata component of the gateway server. From 1014, method 1000 proceeds to 1016.

At 1016, the metadata component of the gateway server receives the OGA-converted OData from the OData channel add-on. The metadata component of the gateway server constructs an OData-compliant model from the received OData. From 1016, method 1000 proceeds to 1018.

At 1018, the metadata component of the gateway server renders an OData-compliant response with the constructed OData-compliant model. The metadata component transmits the rendered OData-compliant response to the client. From 1018, method 1000 proceeds to 1020.

At 1020, the client receives the metadata-component-rendered OData response containing the constructed OData object model. The client processes the received OData response. After 1020, method 1000 stops.

Figure 11:
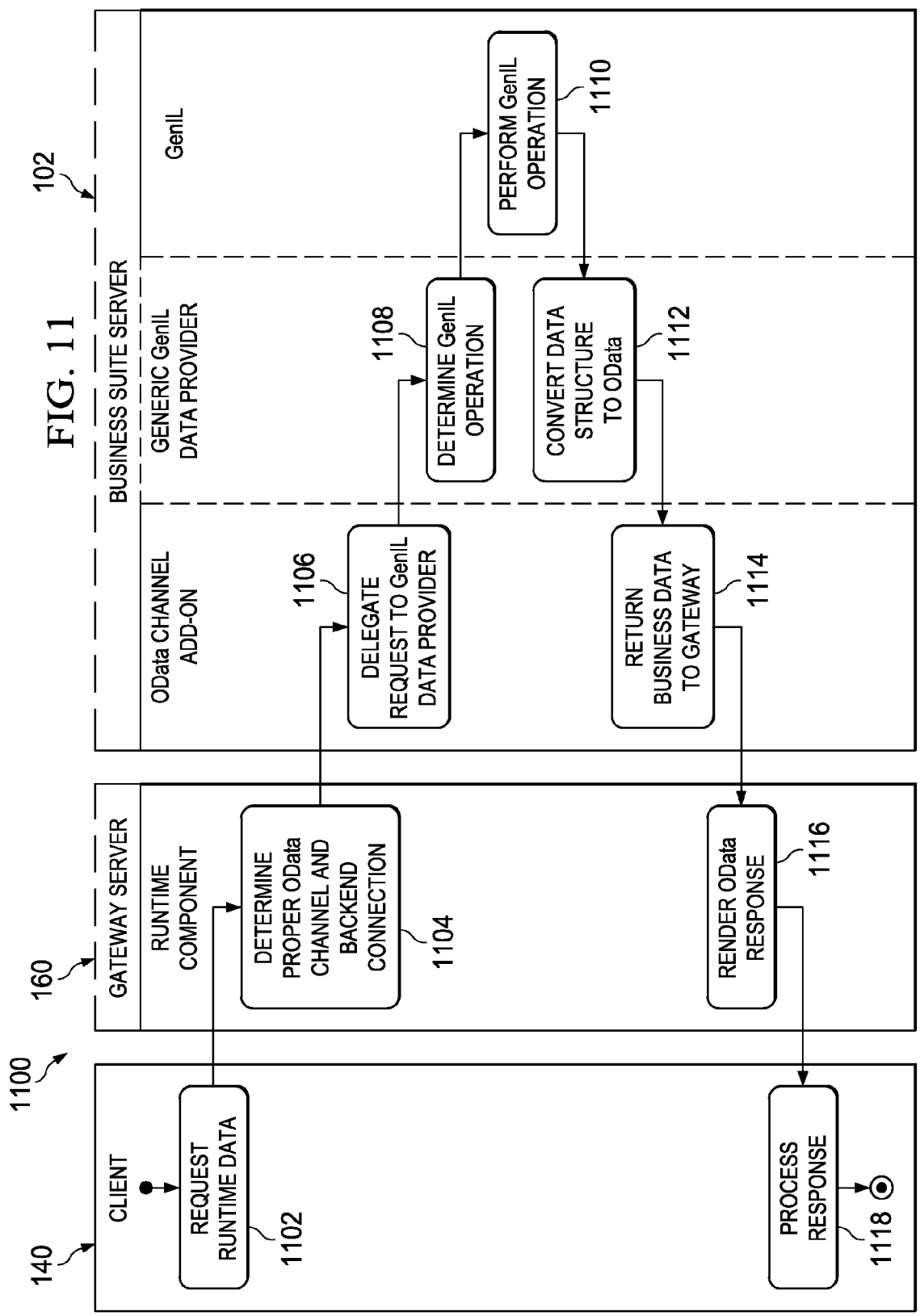
FIG. 11 is a flow chart for converting runtime data associated with an object model mapped from a GenIL-compliant format to an OData-compliant format with the GenIL-OData adaptor incorporated into the business suite server.

Turning now to FIG. 11, FIG. 11 is a flow chart 1100 for converting runtime data associated with an object model mapped from a GenIL-compliant format to an OData-compliant format with the GenIL-OData Adaptor incorporated into the business suite server. For clarity of presentation, the description that follows generally describes method 1100 in the context of FIGS. 1, 8, and 9. However, it will be understood that method 1100 may be performed, for example, by any other suitable system, environment, software, and hardware, or a combination of systems, environments, software, and hardware as appropriate. For example, one or more of the business suite server, the client, or other computing device (not illustrated) can be used to execute method 1100 and obtain any data from the memory of the client, the business suite server, or the other computing device (not illustrated).

At 1102, an OData-compliant request is made by a client to a gateway server for runtime data associated with an object model. From 1102, method 1100 proceeds to 1104.

At 1104, the runtime component of the gateway server receives the client-initiated OData-compliant request. The runtime component determines the proper runtime data provider for GenIL and delegates the request to it. In some implementations, the runtime data provider for GenIL can be a BADI. The determined runtime data provider for GenIL requests the client-requested runtime data from the OData channel-add-on. From 1104, method 1100 proceeds to 1106.

At 1106, the OData channel add-on receives the BADI-initiated request for the client-requested runtime data from the gateway server runtime component. The OData channel add-on delegates the request to the OGA. From 1106, method 1100 proceeds to 1108.

At 1108, the OGA determines the client-requested runtime data and the location of the client-requested runtime data at the business suite back-end memory. The OGA requests the client-requested runtime data from the GenIL with a GenIL-compliant request. From 1108, method 1100 proceeds to 1110.

At 1110, the GenIL receives the OGA-initiated request for the client-requested runtime data. The GenIL loads the runtime data from the business suite server back-end memory. The GenIL transmits the loaded runtime data to the OGA. From 1110, method 1100 proceeds to 1112.

At 1112, the OGA receives the GenIL-loaded runtime data from the GenIL The OGA converts the received runtime data to OData and transmits the OData to the OData channel add-on. From 1112, method 1100 proceeds to 1114.

At 1114, the OData channel add-on returns the OData to the runtime component of the gateway server. From 1114, method 1100 proceeds to 1116.

At 1116, the runtime component of the gateway server renders an OData-compliant response with the constructed OData-compliant runtime data. The runtime component transmits the rendered OData-compliant response to the client. From 1116, method 1100 proceeds to 1118.

At 1118, the client receives the runtime-component-rendered OData response containing the OData runtime data. The client processes the received OData response. After 1118, method 1100 stops.

Returning to FIG. 1, the illustrated example distributed computing system 100 also includes the client 140, or multiple clients 140. The client 140 may be any computing device operable to connect to or communicate with at least the business suite server 102 via the network 130 using a wireline or wireless connection. In general, the client 140 comprises an electronic computer device operable to receive, transmit, process, and store any appropriate data associated with the example distributed computing system 100.

The illustrated client 140 further includes a client application 146. The client application 146 is any type of application that allows the client 140 to request and view content on the client 140. In some implementations, the client application 146 can be and/or include a web browser. In some implementations, the client-application 146 can use parameters, metadata, and other information received at launch to access a particular set of data from the server 102. Once a particular client application 146 is launched, a user may interactively process a task, event, or other information associated with the business suite server 102. Further, although illustrated as a single client application 146, the client application 146 may be implemented as multiple client applications in the client 140.

The illustrated client 140 further includes an interface 152, a processor 144, and a memory 148. The interface 152 is used by the client 140 for communicating with other systems in a distributed environment—including within the example distributed computing system 100—connected to the network 130; for example, the business suite server 102, as well as other systems communicably coupled to the network 130 (not illustrated). Generally, the interface 152 comprises logic encoded in software and/or hardware in a suitable combination and operable to communicate with the network 130. More specifically, the interface 152 may comprise software supporting one or more communication protocols associated with communications such that the network 130 or interface's hardware is operable to communicate physical signals within and outside of the example distributed computing system 100.

As illustrated in FIG. 1, the client 140 includes a processor 144. Although illustrated as a single processor 144 in FIG. 1, two or more processors may be used according to particular needs, desires, or particular implementations of the example distributed computing system 100. Each processor 144 may be a central processing unit (CPU), an application specific integrated circuit (ASIC), a field-programmable gate array (FPGA), or another suitable component. Generally, the processor 144 executes instructions and manipulates data to perform the operations of the client 140. Specifically, the processor 144 executes the functionality required to send requests to the business suite server 102 and to receive and process responses from the business suite server 102.

Further, the illustrated client 140 includes a GUI 142. The GUI 142 interfaces with at least a portion of the example distributed computing system 100 for any suitable purpose, including generating a visual representation of a web browser. In particular, the GUI 142 may be used to view and navigate various web pages located both internally and externally to the business suite server 102.

The illustrated client 140 also includes a memory 148, or multiple memories 148. The memory 148 may include any memory or database module and may take the form of volatile or non-volatile memory including, without limitation, magnetic media, optical media, random access memory (RAM), read-only memory (ROM), removable media, or any other suitable local or remote memory component. The memory 148 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client 140. Additionally, the memory 148 may include any other appropriate data, such as VPN applications, firmware logs and policies, firewall policies, a security or access log, print or other reporting files, as well as others.

There may be any number of clients 140 associated with, or external to, the example distributed computing system 100. For example, while the illustrated example distributed computing system 100 includes one client 140, alternative implementations of the example distributed computing system 100 may include multiple clients 140 communicably coupled to the business suite server 102 and/or the network 130, or any other number suitable to the purposes of the example distributed computing system 100. Additionally, there may also be one or more additional clients 140 external to the illustrated portion of the example distributed computing system 100 that are capable of interacting with the example distributed computing system 100 via the network 130. Further, the term "client" and "user" may be used interchangeably as appropriate without departing from the scope of this disclosure. Moreover, while the client 140 is described in terms of being used by a single user, this disclosure contemplates that many users may use one computer, or that one user may use multiple computers.

The illustrated client 140 is intended to encompass any computing device such as a desktop computer, laptop/notebook computer, wireless data port, smart phone, personal data assistant (PDA), tablet computing device, one or more processors within these devices, or any other suitable processing device. For example, the client 140 may comprise a computer that includes an input device, such as a keypad, touch screen, or other device that can accept user information, and an output device that conveys information associated with the operation of the business suite server 102 or the client 140 itself, including digital data, visual information, or a GUI 142, as shown with respect to the client 140.

Although this disclosure discusses an adaptor providing an interface between OData and GenIL, as will be appreciated by one of ordinary skill in the art, the adaptor may be adapted to provide an interface between any suitable communication protocols and/or data formats without departing from the spirit of the disclosure.

The preceding figures and accompanying description illustrate example processes and computer implementable techniques. But example distributed computing system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the steps in these processes may take place simultaneously, concurrently, in parallel, and/or in different orders than as shown. Moreover, example distributed computing system 100 may use processes with additional steps, fewer steps, and/or different steps, so long as the methods remain appropriate. Process steps may also be executed and described software/services may also execute on various components of example distributed computing system 100 so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method, comprising:
receiving an open data protocol (OData)-compliant request for data, wherein the OData-compliant request for data is for at least one of an object model or object-model-associated runtime data associated with an object model mapped from a generic interaction layer (GenIL)-compliant format to an OData-compliant format;
processing the request with a generic runtime component that remains stateless between individual OData-compliant requests for data and access to determined memory locations of the data;
determining, using at least one computer, a GenIL data provider to receive the OData-compliant request for data; and
transmitting a rendered OData-compliant response with the data as received from a determined memory location.

2. The computer-implemented method of claim 1, comprising converting, using at least one computer, the received data into an OData-compliant format.

3. The computer-implemented method of claim 1, wherein the OData-compliant request for data is generated pre-runtime.

4. The computer-implemented method of claim 1, comprising rendering the OData-compliant response.

5. The computer-implemented method of claim 1, wherein the GenIL data provider provides GenIL-compliant data for at least one of an object model or runtime data.

6. The computer-implemented method of claim 1, further comprising requesting the data from a determined memory location, wherein the request for the data from the determined memory location is in a GenIL-compliant format.

7. The computer-implemented method of claim 1, further comprising constructing an OData object model from data received from the determined memory location.

8. A computer-program product, the computer program product comprising computer-readable instructions embodied on tangible, non-transitory media, the instructions operable when executed to perform operations to:
  receive an open data protocol (OData)-compliant request for data, wherein the OData-compliant request for data is for at least one of an object model or object-model-associated runtime data associated with an object model mapped from a generic interaction layer (GenIL)-compliant format to an OData-compliant format;
  process the request with a generic runtime component that remains stateless between individual OData-compliant requests for data and access to determined memory locations of the data;
  determine, using at least one computer, a GenIL data provider to receive the OData-compliant request for data; and
  transmit a rendered OData-compliant response with the data as received from a determined memory location.

9. The computer-program product of claim 8, further comprising one or more instructions to convert the received data into an OData-compliant format.

10. The computer-program product of claim 8, wherein the OData-compliant request for data is generated pre-runtime.

11. The computer-program product of claim 8, further comprising one or more instructions to render the OData-compliant response.

12. The computer-program product of claim 8, wherein the GenIL data provider provides GenIL-compliant data for at least one of an object model or runtime data.

13. The computer-program product of claim 8, further comprising one or more instructions to request the data from a determined memory location, wherein the request for the data from the determined memory location is in a GenIL-compliant format.

14. The computer-program product of claim 8, further comprising one or more instructions to construct an OData object model from data received from the determined memory location.

15. A system, comprising:
  a computer memory operable to store at least one of object model or object-model-associated runtime data; and
  at least one hardware processor interoperably coupled to the computer memory and configured to:
    receive an open data protocol (OData)-compliant request for data, wherein the OData-compliant request for data is for at least one of an object model or object-model-associated runtime data associated with an object model mapped from a generic interaction layer (GenIL)-compliant format to an OData-compliant format;
    process the request with a generic runtime component that remains stateless between individual OData-compliant requests for data and access to determined memory locations of the data;
    determine, using at least one computer, a GenIL data provider to receive the OData-compliant request for data; and
    transmit a rendered OData-compliant response with the data as received from a determined memory location.

16. The system of claim 15, further configured to convert the received data into an OData-compliant format.

17. The system of claim 15, wherein the OData-compliant request for data is generated pre-runtime.

18. The system of claim 15, further configured to render the OData-compliant response.

19. The system of claim 15, wherein the GenIL data provider provides GenIL-compliant data for at least one of an object model or runtime data.

20. The system of claim 15, further configured to:
  request the data from a determined memory location, wherein the request for the data from the determined memory location is in a GenIL-compliant format; and
  construct an OData object model from data received from the determined memory location.

* * * * *